United States Patent
Fukuman et al.

(10) Patent No.: US 9,575,179 B2
(45) Date of Patent: Feb. 21, 2017

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-pref (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/919,498

(22) Filed: Oct. 21, 2015

(65) Prior Publication Data

US 2016/0116584 A1 Apr. 28, 2016

(30) Foreign Application Priority Data

Oct. 22, 2014 (JP) .................................. 2014-215095

(51) Int. Cl.
| | |
|---|---|
| G01S 15/00 | (2006.01) |
| G01S 15/93 | (2006.01) |
| G01S 15/46 | (2006.01) |
| G01S 15/87 | (2006.01) |

(52) U.S. Cl.
CPC .............. *G01S 15/931* (2013.01); *G01S 15/46* (2013.01); *G01S 15/878* (2013.01); *G01S 2015/465* (2013.01); *G01S 2015/938* (2013.01)

(58) Field of Classification Search
CPC ... G01S 15/04; G01S 15/931; G01S 2015/938

USPC .................................. 367/93; 340/435, 436
See application file for complete search history.

(56) References Cited

U.S. PATENT DOCUMENTS

| | | | | |
|---|---|---|---|---|
| 2006/0031015 A1* | 2/2006 | Paradie | .............. | G06K 9/00805 701/301 |
| 2008/0068146 A1* | 3/2008 | Cauldwell | ................ | B60Q 9/00 340/435 |
| 2011/0133917 A1* | 6/2011 | Zeng | .................... | G06K 9/6293 340/436 |

FOREIGN PATENT DOCUMENTS

JP 2005-070943 A 3/2005

* cited by examiner

*Primary Examiner* — Kerri McNally
(74) *Attorney, Agent, or Firm* — Knobbe, Martens, Olson & Bear, LLP

(57) ABSTRACT

An object detection apparatus is installed in a movable body and detects an object. The apparatus includes a first detection section which transmits search waves in a moving direction of the moving object, and receives reflected waves as detection information to detect the object, a second detection section which transmits search waves in the moving direction, and receives reflected waves as detection information, an obstacle determination section which determines that an obstacle is present in the moving direction, based on detection results of the first and second detection sections, and a crossing determination section which determines that the obstacle has crossed, in a state where the obstacle determination section determines that the obstacle is present, if the determination that the obstacle is present is made by continuous detection, and if a state where the object is continuously detected changes to a state where the object is not detected.

14 Claims, 3 Drawing Sheets

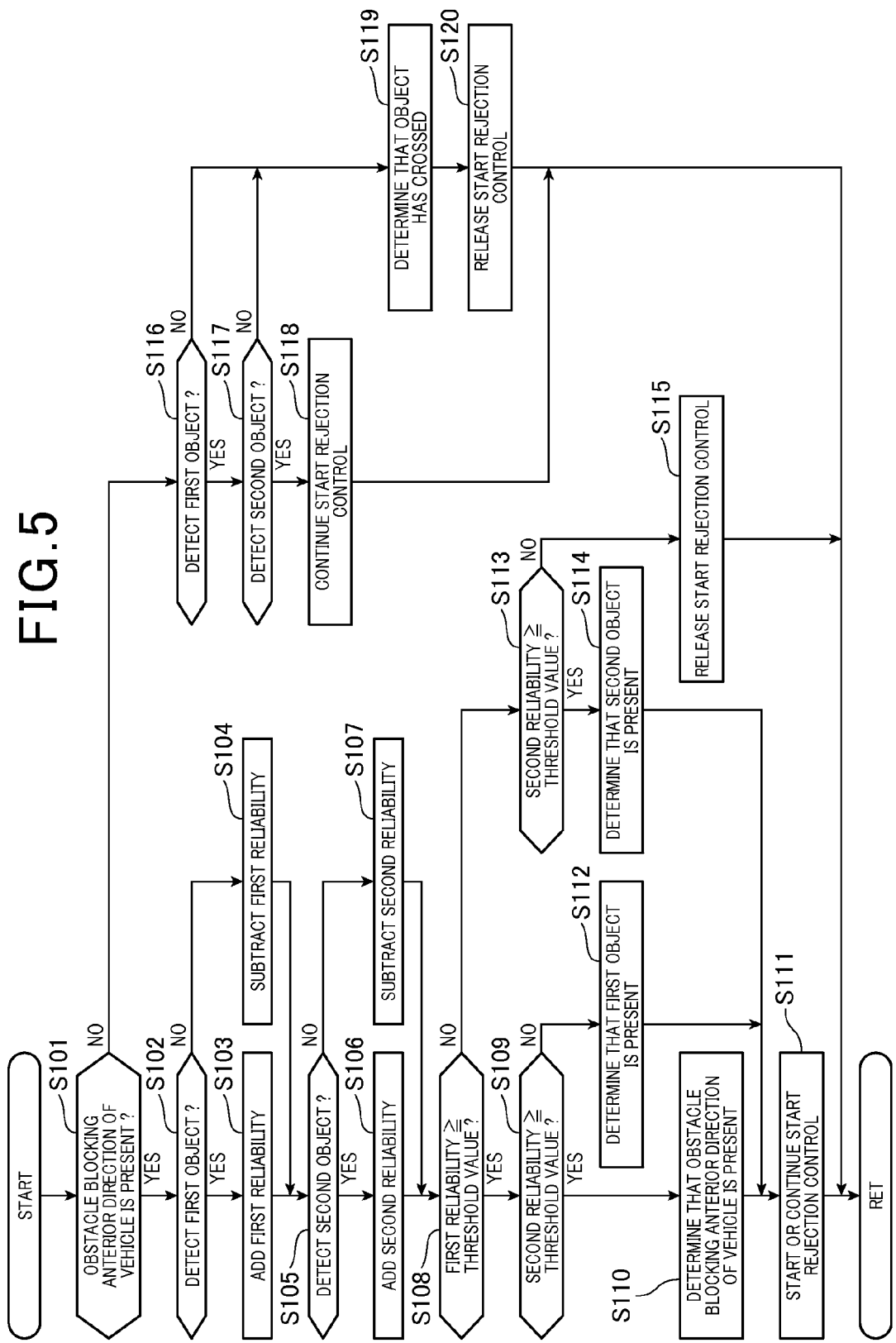

OBJECT DETECTION APPARATUS

CROSS-REFERENCE TO RELATED APPLICATION

This application is based on and claims the benefit of priority from earlier Japanese Patent Application No. 2014-215095 filed Oct. 22, 2014, the description of which is incorporated herein by reference.

BACKGROUND (Technical Field)

The present invention relates to an object detection apparatus which detects a peripheral object.

(Related Art)

Conventionally, techniques are proposed in which a range sensor such as an ultrasonic sensor is installed in an own vehicle to detect objects present around the own vehicle, the objects including a preceding vehicle, a pedestrian, and an obstacle. In addition, based on the detection results, various controls for improving running safety of the own vehicle are performed such as operation of the brake unit and providing an alarm to the driver.

JP-A-2005-70943 discloses an object detection apparatus for detecting an object around an own vehicle. In the object detection apparatus, the position of the object is detected, and a path along which the own vehicle travels is predicted, to determine whether or not the own vehicle can come into contact with the object based on the result of the prediction.

When performing control so that an own vehicle and an object do not contact each other by predicting the contact between the own vehicle and the object, a situation can be assumed in which, for example, another vehicle parked in a state of blocking the anterior direction of the vehicle starts running. Even when the other vehicle starts running, the path along which the own vehicle will run crosses the position of the other vehicle until the other vehicle exits from the position ahead of the own vehicle. Thereby, control for restraining the start of the own vehicle is performed. Meanwhile, if the other vehicle leaves the position ahead of the own vehicle after starting, the driver of the own vehicle may determine that the own vehicle is unlikely to come into contact with the other vehicle when starting the own vehicle. Hence, the driver starts the own vehicle. In this case, if the own vehicle is performing control for restraining the start of the own vehicle, the control is against the intention of the driver.

SUMMARY

An embodiment provides an object detection apparatus which can appropriately determine crossing of an obstacle present in the moving direction of a movable body.

As an aspect of the embodiment, an object detection apparatus is installed in a movable body and detects an object present around the movable body. The apparatus includes: a first detection section which transmits search waves in a moving direction of the moving object, and receives reflected waves of the search waves as detection information of the object, to detect the object; a second detection section which transmits search waves in the moving direction of the movable body from a position different from that of the first detection section, and receives reflected waves of the search waves as detection information of the object, to detect the object; an obstacle determination section which determines that an obstacle is present in the moving direction of the moving object, based on a detection result of the object of the first detection section and a detection result of the object of the second detection section; and a crossing determination section which determines that the obstacle has crossed, in a state where the obstacle determination section determines that the obstacle is present, if the determination that the obstacle is present is made by continuous detection for a predetermined time period by the first and second detection sections, and if a state where the object is continuously detected changes to a state where the object is not detected by any of the first and second detection sections.

BRIEF DESCRIPTION OF THE DRAWINGS

In the accompanying drawings:

FIG. 5 is a flowchart showing a process according to an embodiment.

DETAILED DESCRIPTION OF THE PREFERRED EMBODIMENTS

Figure 1:
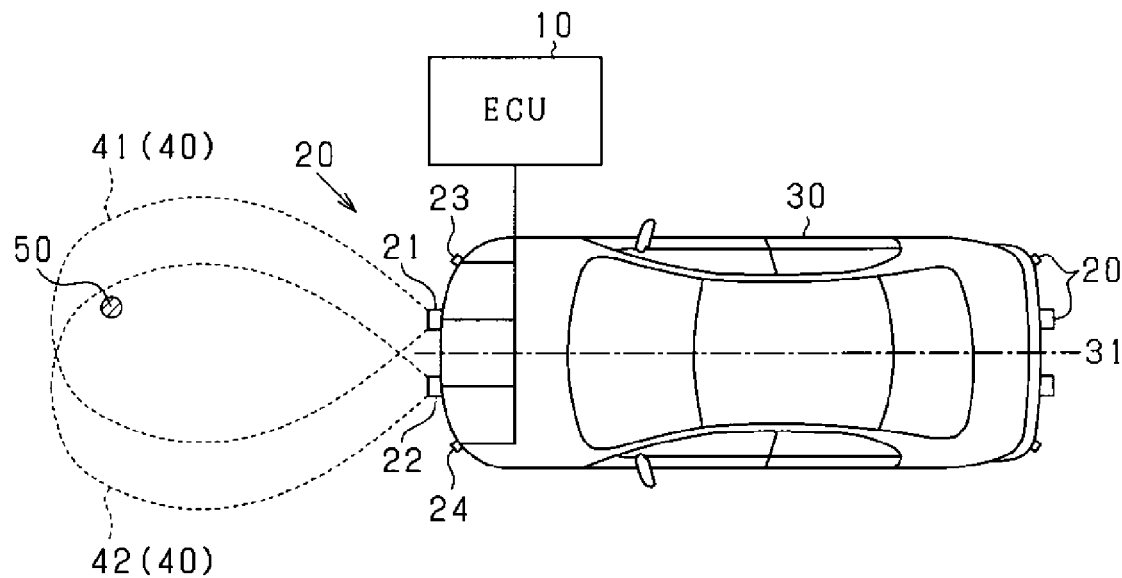
FIG. 1 is a drawing showing a schematic configuration of an object detection apparatus.

With reference to the accompanying drawings, hereinafter are described embodiments. Throughout the drawings, components identical with or similar to each other are given the same reference numerals for the sake of omitting unnecessary explanation.

Hereinafter, the first embodiment is described in which an object detection apparatus installed in a movable body is embodied, with reference to the drawings. The object detection apparatus according to the present embodiment is an in-vehicle apparatus installed in an own vehicle as a movable body. The object detection apparatus receives detection information on an object from a range sensor to detect, for example, another vehicle or a road structure as an object present around the own vehicle. First, the schematic configuration of an object detection system for a vehicle according to the present embodiment is explained with reference to FIG. 1.

A range sensor 20 is, for example, an ultrasonic sensor, and has a function of transmitting ultrasonic waves with frequencies of 20 to 100 kHz as search waves and a function of receiving the search waves reflected from an object as reflected waves. In the present embodiment, four range sensors 20 are attached to the front part (e.g. front bumper) of a vehicle 30 (movable body) at predetermined distances so as to be arranged in the direction (vehicle width direction) perpendicular to the traveling direction of the vehicle 30. Specifically, the range sensors 20 include two center sensors (first sensor 21 and second sensor 22) attached in the vicinity of a center line 31 of the vehicle 30 and at symmetrical positions with respect to the center line 31, and corner sensors 23, 24 respectively attached at the left corner and the right corner of the vehicle 30. Note that, range sensors 20 are also attached to the rear part (e.g. rear bumper) of the vehicle 30. However, since the attachment positions and the function of the range sensors 20 of the rear part are the same as those of the range sensors 20 of the front part, the explanations thereof are omitted.

In each of the range sensors 20, an object detection range 40 is set as an area where reflected waves (direct waves) of the search waves transmitted therefrom can be received. The range sensors 20 are attached so that the object detection ranges 40 of the adjacent two range sensors 20 overlap with each other. Note that, in FIG. 1, only object detection ranges 41, 42 of the first and second sensors 21, 22 are shown. However, the object detection range 40 is set for each of the corner sensors 23, 24 as in the case of the first and second sensors 21, 22. In the range sensors 20, a threshold value of the amplitude of a reflected wave is set. When the range sensors 20 receive a reflected wave having the amplitude equal to or more than the threshold value, the range sensors 20 transmit detection information including the time when the range sensors 20 received the reflected wave to an ECU (electronic control unit) 10 serving as the object detection apparatus.

The ECU 10 is mainly configured by a microcomputer including a CPU and various memories. The ECU 10 determines presence or absence of an object 50 around the vehicle based on the detection information of the object 50 received from the range sensors 20. Specifically, the ECU 10 transmits a control signal to each of the range sensors 20. In one transmission time, the ECU 10 instructs each of the range sensors 20 to transmit one search wave in sequence. In this case, each of the range sensors 20 transmits a search wave 25 in sequence at an interval longer than the time period during which the search wave travels to and returns from the object within the object detection range 40, so that the range sensor 20 having transmitted the search wave can be determined when receiving the reflected wave.

In addition, when the ECU 10 receives the detection information of the object 50 from the range sensor 20, the ECU 10 determines presence or absence of the object 50 around the vehicle based on the received detection information. If the ECU 10 determines that an object 50 is present around the vehicle, the ECU 10 performs steering wheel control or deceleration control of the vehicle 30 as contact avoidance control or gives notification by warning sound to the driver of the vehicle 30, so that the vehicle 30 does not come into contact with the object 50.

The ECU 10 calculates a position (coordinates) of the vehicle 50 relative to the vehicle 30 based on the principle of triangulation by using the detection information of the object 50 received from the range sensors 20. According to the principle of triangulation, as known, coordinates of a measurement point are calculated from a known distance between two points and distances between the known two points and the measurement point. Using this principle, the ECU 10 calculates the position (coordinates) of the vehicle 50 by using the distance between the two range sensors 20 whose object detection ranges 40 overlap with each other and the distances between the range sensors 20 and the object 50.

Figure 2:
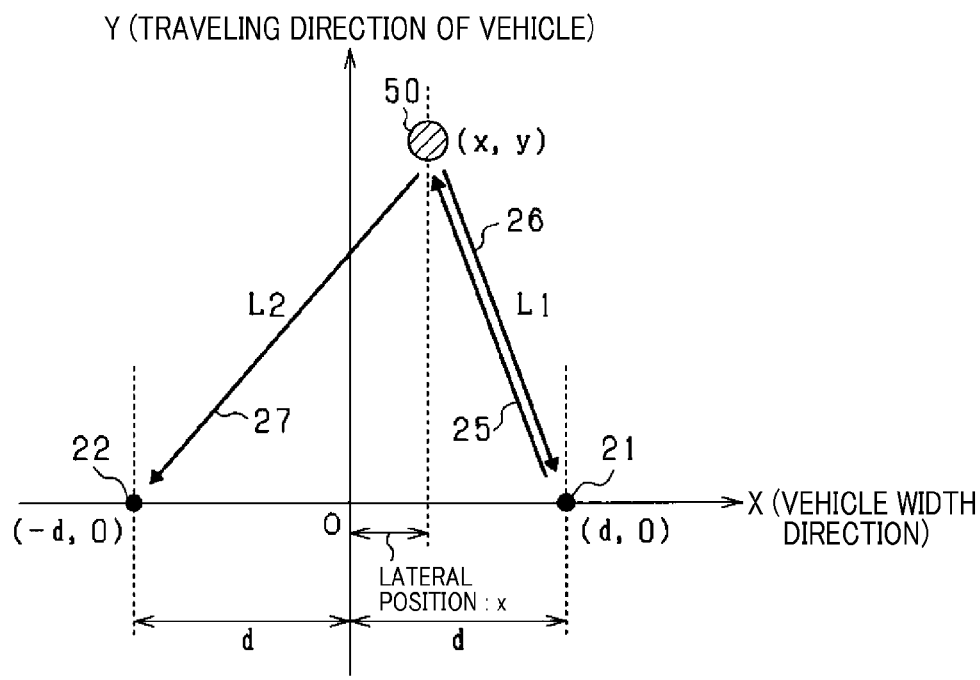
FIG. 2 is a drawing for explaining a method of calculating an estimated position of an object.

FIG. 2 is a drawing for explaining a method of calculating the position of the object 50, and shows the first and second sensors 21, 22 and the object 50 positioned ahead of the first and second sensors 21, 22 in planar view. Note that, in FIG. 2, the first sensor 21 is a direct detection sensor which transmits the search wave 25 and receives a direct wave 26. The second sensor 22 is an indirect detection sensor which receives a reflected wave of the search wave 25 transmitted from the first sensor 21 as an indirect wave 27.

The ECU 10 provides a coordinate system in which the X-axis is a straight line passing through the first and second sensors 21, 22, and the Y-axis is a straight line passing through the middle of the first sensor 21 and the second sensor 22 and perpendicular to the X axis. The ECU 10 calculates an X-coordinate and a Y-coordinate of the coordinate system as an estimated position of the object 50. Specifically, the ECU 10 makes the first sensor 21 transmit the search wave 25. Then, when the first sensor 21 receives the reflected search wave 25 as the direct wave 26, the ECU 10 calculates the distance between the first sensor 21 and the object 50 based on the direct wave 26. In addition, when the second sensor 22 receives the reflected wave of the search wave 25 as the indirect wave 27, the ECU 10 calculates the distance between the second sensor 22 and the object 50 based on the received indirect wave 27.

The distance between the origin O, which is the intersection of the X-axis and the Y-axis, and the first sensor 21 and the distance between the origin O and the second sensor 22, which are distances d, are equal to each other and are previously stored in the ECU 10. In addition, the ECU 10 defines the time period between the time when the first sensor 21 transmits the search wave 25 and the time when the first sensor 21 receives the direct wave 26 as first time period t1, and defines the time period between the time when the first sensor 21 transmits the search wave 25 and the time when the second sensor 22 receives the indirect wave 27 as second time period t2. In this case, the value obtained by multiplying the first time period t1 by the speed of sound is twice the distance between the first sensor 21 and the object 50. The value obtained by multiplying the second time period t2 by the speed of sound is the sum of the distance between the first sensor 21 and the object 50 and the distance between the second sensor 22 and the object 50. The ECU 10 calculates the coordinates (x, y) of the object 50 by performing calculation based on the triangulation by using the distance 2d between the first sensor 21 and the second sensor 22 and the measured first time period t1 and second time period t2.

Note that, in FIG. 2, one example is explained in which the first sensor 21 is a direct detection sensor, and the second sensor 22 is an indirect detection sensor. However, even in a case where the first sensor 21 is an indirect detection sensor, and the second sensor 22 is a direct detection sensor, the position of the object 50 is calculated in a similar manner. In addition, the position of the object 50 is calculated based on all combinations of adjacent two sensors among four sensors 21 to 24. Similarly, the position of the object 50 around the vehicle is calculated based on all combinations of adjacent two sensors among the range sensors 20 of the rear part of the vehicle.

Figure 3:
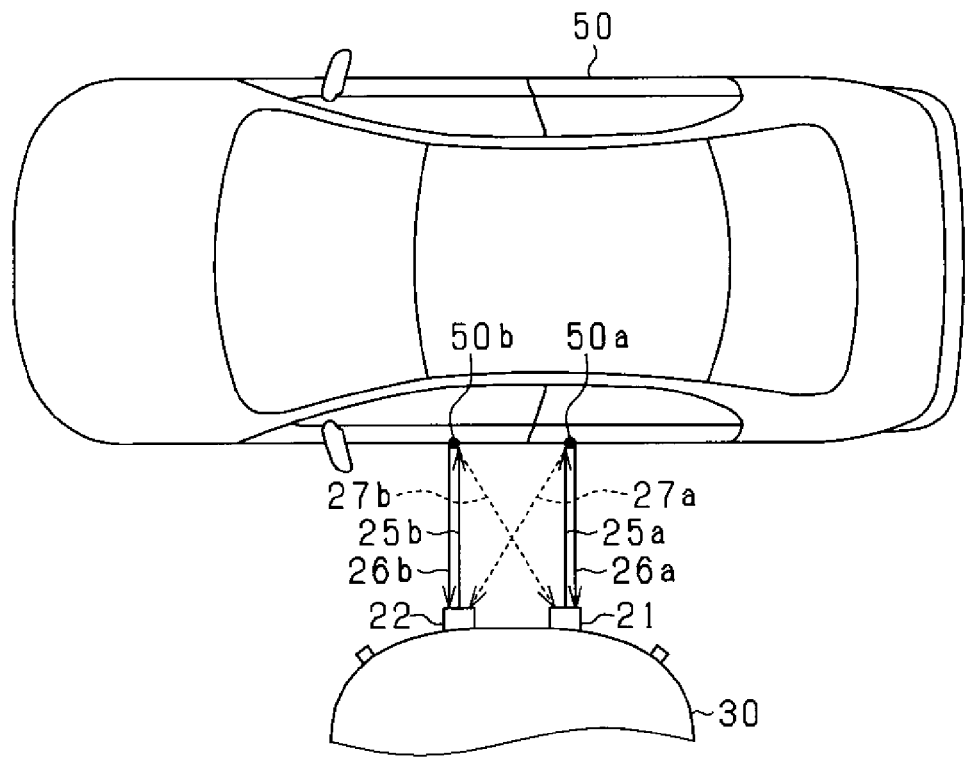
FIG. 3 is a drawing showing a detection state of the object when another vehicle stops ahead of an own vehicle.

As shown in FIG. 3, a case may be caused in which another vehicle is present as an obstacle so as to block the anterior direction (moving direction) of the vehicle 30. In this case, the position of the object 50 detected by using the first sensor 21 as the direct detection sensor and the second sensor 22 as the indirect detection sensor differs from the position of the object 50 detected by using the first sensor 21 as the indirect detection sensor and the second sensor 22 as the direct detection sensor. Hence, by using the fact that the positions of the detected object 50 differs between the case where the first sensor 21 is used as the direct detection sensor and the case where the second sensor 22 is used as the direct detection sensor, it can be determined whether or not an object 50 blocking the long distance of the vehicle 30 is present.

A search wave 25a transmitted from the first sensor 21 is reflected by a side surface of the other vehicle, and enters the first sensor 21 as a direct wave 26a and the second sensor 22 as an indirect wave 27a. Then, a point of the side surface of the other vehicle (forward vehicle) is detected as a first object 50a. In this case, the determination whether or not the first object 50a is present is made based on whether or not the position of the first object 50a is stably calculated in multiple transmission times. Specifically, it is assumed that the first object 50a is detected by the search wave 25a transmitted from the first sensor 21. In this case, a first counter starts being incremented, related to the position of the first object 50a, incrementing of the first counter corresponding to reliability for determining whether or not the first object 50a is actually present. In the successive transmission time, when the object 50 is detected at the same position as that where the first object 50a was detected last time, a first reliability is added assuming that the detected object 50 is the first object 50a. This process is repeatedly performed. If the first reliability exceeds a predetermined threshold value, it is determined that the first object 50a is present.

Similarly, a search wave 25b transmitted from the second sensor 22 is reflected by the side surface of the other vehicle, and enters the second sensor 22 as a direct wave 26b and the second sensor 22 as an indirect wave 27b. Then, a point of the side surface of the other vehicle is detected as a second object 50b. Then, as in the case of the first object 50a, a second counter starts being incremented, related to the position of the second object 50b, incrementing of the second counter corresponding to reliability for determining whether or not the second object 50b is actually present. If the second reliability exceeds the predetermined threshold value, it is determined that the second object 50b is present. If at least one of the first reliability and the second reliability exceeds the predetermined threshold value, control (start rejection control) is performed under which the vehicle 30 is not allowed to start because the vehicle 30 might come into contact with the object 50 when the vehicle 30 starts.

Note that, in any of the transmission times at which the search wave is transmitted at predetermined intervals, the detection of the first object 50a or the second object 50b may fail even when the other vehicle is present in the vicinity of the vehicle 30. In this case, the first reliability or the second reliability is subtracted. In the successive transmission time, if the first object 50a or the second object 50b is detected, the first reliability or the second reliability is added.

If the first reliability and the second reliability exceed the threshold value, it is determined that the first object 50a and the second object 50b are still ahead of the vehicle 30.

Figure 4:
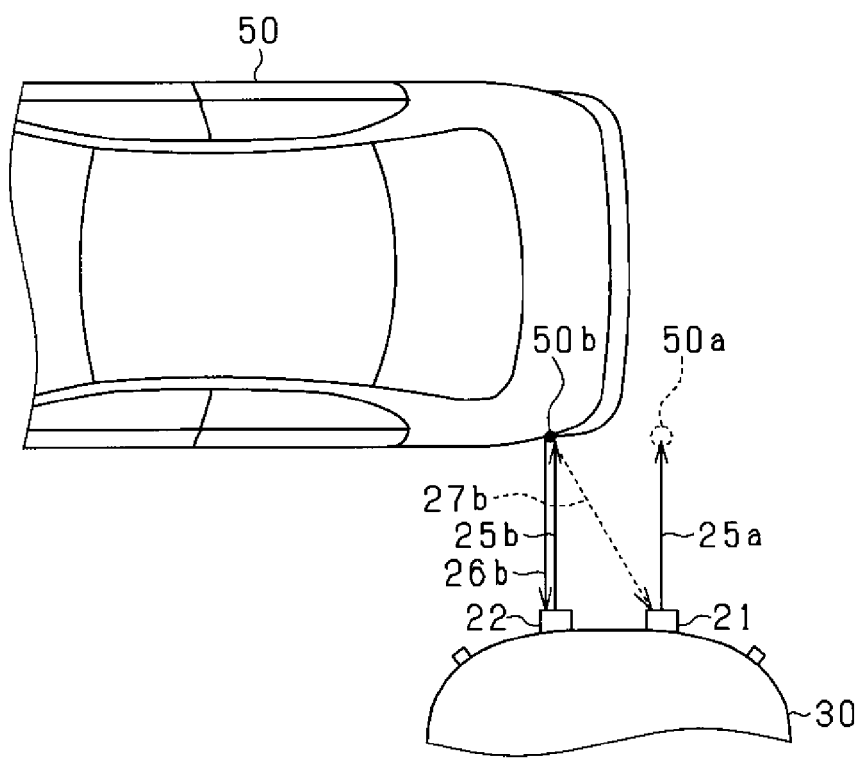
FIG. 4 is a drawing showing a detection state of the object when another vehicle moves which has stopped ahead of the own vehicle.

The other vehicle may move so as to cross the anterior direction of the vehicle 30 after the other vehicle stops ahead of the vehicle 30. For example, as shown in FIG. 4, if shifting from a state where both the first object 50a and the second object 50b are detected to a case where the first object 50a is not detected and only the second object 50b is detected, and then the other vehicle is not present ahead of the vehicle 30, neither the first object 50a nor the second object 50b are detected. FIG. 4 exemplifies a case where the other vehicle moves from right to left ahead of the vehicle 30, thereby shifting to a case where the first object 50a is not detected. However, a case where the other vehicle moves from left to right ahead of the vehicle 30 can be considered in a similar manner.

In this case, if reliabilities regarding the first object 50a and the second object 50b are subtracted, and the start rejection control is released on condition that the reliability becomes smaller than a threshold value, the start rejection control is not immediately released regardless of movement of the other vehicle. That is, as described above, one transmission time of the search wave is several hundred millisecond. Hence, if subtraction of the reliability is performed when the first object 50a and the second object 50b are not detected, a longer time is required until the reliability falls below the threshold value. That is, an absence determination time period for stably determining the absence of the object is provided to make the ECU 10 function as an absence determination means (section). In this case, the driver of the vehicle 30 cannot start the vehicle 30 regardless of having recognized the movement of the forward other vehicle. Hence, control which is against the intention of the driver is performed.

To solve the problem, in the present embodiment, it is determined whether or not an obstacle blocking the anterior direction (moving direction) of the vehicle 30 has moved so as to cross the anterior direction of the vehicle 30. If determined that the vehicle 30 has moved so as to cross the anterior direction of the vehicle 30, a process for releasing the start rejection control is immediately performed. Specifically, when the first object 50a and the second object 50b are detected during a plurality of transmission times, that is, when the first object 50a and the second object 50b are continuously detected during a predetermined time period, it is determined that an obstacle blocking the anterior direction of the vehicle 30 is present. Then, on condition that one of the first object 50a and the second object 50b is not detected, it is determined that an obstacle has blocked the anterior direction of the vehicle 30. Then, the start rejection control is released.

Note that crossing broadly means that the other vehicle (obstacle) passes in a direction intersecting with the moving direction of the vehicle 30 from a state where the other vehicle is present ahead of or behind the vehicle 30 (movable body). For example, a state is included in crossing where another vehicle enters in the anterior direction of the vehicle 30 from the right side (or left side) and thereafter returns to the right side.

FIG. 5 is a flowchart showing a process performed by the ECU 10 according to the embodiment. The process starts when the vehicle 30 is at a stop, and is performed once during one transmission time of the search wave.

First, the ECU 10 determines whether or not an obstacle blocking the anterior direction of the vehicle 30 is present (S101). If determining that an obstacle blocking the anterior direction of the vehicle 30 is not present (S101: NO), the ECU 10 functions as a first detection means (section) to determine whether or not the first object 50a is detected (S102). In the step of S102, if the first object 50a has not previously been detected, but is detected in the current process, the ECU 10 determines that the first object 50a is detected. If the first object 50a has previously been detected, and if an object is detected at the same position as that of or in the vicinity of the previously detected first object 50a, the ECU 10 determines that the first object 50a is detected. If determining that the first object 50a is detected (S102: YES), the ECU 10 starts addition of reliabilities of the first object 50a, or adds a reliability to the value of the previous reliability (S103). If determining that the first object 50a is not detected (S102: NO), the addition of reliability of the first object 50a is not performed, or subtraction from the value of the previous reliability is performed (S104). Similarly, the ECU 10 functions as a second detection means (section) to perform a process for the second object 50*b* according to the process regarding the first object 50*a* (S105 to S107).

Next, the ECU 10 determines whether or not the first reliability is equal to or more than a threshold value (S108). If the first reliability is equal to or more than the threshold value (S108: YES), the ECU 10 also determines whether or not the second reliability is equal to or more than the threshold value (S109). If the second reliability is equal to or more than the threshold value as in the case of the first reliability (S109: YES), the first object 50*a* and the second objet 50*b* are present. Hence, the ECU 10 determines that an obstacle blocking the anterior direction of the vehicle 30 is present (S110). In this case, the ECU 10 functions as an obstacle determination means (section). Then, the ECU 10 functions as a restriction means (section), by which the start rejection control is continued if it has already been performed, or the start rejection control is started if it has not been performed (S111).

If the ECU 10 determines that the first reliability is equal to or more than the threshold value (S108: YES), and the second reliability is less than the threshold value (S109: NO), the ECU 10 determines that only the first object 50*a* is present (S112). Similarly, if the first reliability is less than the threshold value (S108: NO), and the second reliability is equal to or more than the threshold value (S113: YES), the ECU 10 determines that only the second object 50*b* is present (S114). Even when the determination is made in S112 or S114, the start rejection control is continued if it has already been performed, or the start rejection control is started if it has not been performed (S111). Note that if both the first reliability and the second reliability are smaller than the threshold value (S108: NO, S113: NO), the possibility that the object 50 is present ahead of the vehicle 30 is lower. Hence, the ECU 10 releases the start rejection control if it has already been performed (S115).

At the transmission time after it is determined that an obstacle blocking the anterior direction of the vehicle 30 is present in S110, the ECU 10 makes positive determination in S101 (S101: YES). In this case, the ECU 10 performs a process for determining whether or not an obstacle blocking the anterior direction of the vehicle 30 has crossed the anterior direction of the vehicle 30. In this case, the ECU 10 determines whether or not the first object 50*a* is detected (S116) and whether or not the second object 50*b* is detected (S117). If positive determination is made in both S116 and S117, an obstacle blocking the anterior direction of the vehicle 30 is present. Hence, the ECU 10 continues the start rejection control and completes the process. Meanwhile, if negative determination is made in one of S116 and S117, it means that after the first object 50*a* and the second object 50*b* are stably detected, at least one of the first object 50*a* and the second object 50*b* is not present. Hence, the ECU 10 determines that the object 50, which blocked the anterior direction of the vehicle 30, has crossed the anterior direction of the vehicle 30 (S118). In this case, the ECU 10 functions as a crossing determination means (section). Then, the ECU 10 releases the start rejection control (S119), and completes the process.

Note that when detecting both the position of the first object 50*a* and the position of the second object 50*b*, as the distance between the vehicle 30 and the other vehicle becomes longer, unevenness of the detected positions occurs. Hence, by providing threshold values for the distances detected by the first sensor 21 and second sensor 22 as a condition for performing the process of the above flowchart, the above process may be performed only when the first object 50*a* and the second object 50*b* are within a predetermined short distance range.

According to the above configuration, the object detection apparatus according to the present embodiment provides the following advantages.

If the presence of an obstacle is determined by a single detection means, the presence may be temporary when a detection state changes to a non-detection state. Hence, to detect an obstacle with high reliability, it is desirable to determine the absence of an obstacle not immediately but at the time when the absence determination time period has passed. For example, in a state where a movable body is moving, detecting an obstacle can be considered to be relatively unstable. On the basis of this state, it is desirable to improve the reliability of detecting an object.

Meanwhile, when the obstacle is crossing, if the vehicle 30 performs start rejection control though the driver recognizes that the obstacle has passed, the behavior of the vehicle 30 is against the intention of the driver. To allow the behavior of the vehicle 30 to meet the intention of the driver, it is desirable to perform crossing determination for an obstacle as soon as possible, that is, before the absence determination time period passes, to release the start rejection control.

In the present embodiment, the presence of an obstacle is determined on the condition that the plurality of range sensors 20 stably detect the object 50. In addition, crossing of the object 50 is determined on the condition that any of the range sensors 20 does not detect the object 50. Then, the start rejection control is released. Hence, the accuracy in detecting the object 50 can be increased, thereby restricting the control which would otherwise be against the intention of the driver.

<Modifications>

In the above embodiment, the first sensor 21 and the second sensor 22 are used. However, in addition to at least one of the first sensor 21 and the second sensor 22, another vehicle ahead of the vehicle 30 and the movement of the other vehicle may be detected by using at least one of the corner sensors 23, 24. When three or more range sensors 20 are used, the movement of the object 50 may be determined on condition that one of the range sensors 20 determines that the object 50 is not detected.

In the above embodiment, by using a threshold value for determining the presence of the object 50, if the reliability exceeds a threshold value, it is determined that an object is present. If the reliability falls below the threshold value, it is determined that an object is not present. However, a threshold value for determining that an object is not present may be lower than a threshold value for determining that an object is present. Thereby, at a transmission time next to the transmission time at which the reliability exceeds the threshold value, it is not immediately determined that an object is not present even when it is determined that an object is not detected. Hence, accuracy can be improved in determining whether or not an object is present.

In the above embodiment, the presence of an obstacle blocking the anterior direction of the vehicle 30 is detected. However, even when an obstacle present in the posterior direction (movement direction) of the vehicle 30 is detected to restrict reversing of the vehicle 30, a similar process can be applied.

In the above embodiment, the process for determining whether or not an obstacle blocking the anterior direction of the vehicle 30 is present is performed on condition that the vehicle 30 is stopped. However, for example, when the vehicle 30 is moving slowly, the process may be performed in a situation in which positions of the first object 50*a* and the second object 50*b* can be stably detected. In this case, speed of the vehicle 30 may be acquired to determine whether or not the object 50 ahead of the vehicle 30 is stopped.

In the above embodiment, triangulation is performed. However, a method using only direct waves may be applied. When applying the method using only direct waves, the movement of an object may be determined on condition that any of the sensors does not detect the object after each of the plurality of sensors stably detects the distance from the object.

In the above embodiment, the object detection apparatus is installed in the vehicle 30. However, the object detection apparatus may be installed in a movable body other than vehicles, for example, a plane, or a ship.

In the above embodiment, ultrasonic waves are used as search waves. However, waves other than ultrasonic waves, for example, sound waves or radio waves may be used as search waves.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, an object detection apparatus (10) is installed in a movable body (30) and detects an object present around the movable body. The apparatus includes: a first detection section which transmits search waves in a moving direction of the moving object, and receives reflected waves of the search waves as detection information of the object, to detect the object; a second detection section which transmits search waves in the moving direction of the movable body from a position different from that of the first detection section, and receives reflected waves of the search waves as detection information of the object, to detect the object; an obstacle determination section which determines that an obstacle is present in the moving direction of the moving object, based on a detection result of the object of the first detection section and a detection result of the object of the second detection section; and a crossing determination section which determines that the obstacle has crossed, in a state where the obstacle determination section determines that the obstacle is present, if the determination that the obstacle is present is made by continuous detection for a predetermined time period by the first and second detection sections, and if a state where the object is continuously detected changes to a state where the object is not detected by any of the first and second detection sections.

In a state where another movable body is stopped ahead of an own movable body, if the other movable body moves, it is assumed that the operator of the own movable body recognizes the movement of the other movable body to immediately move the own movable body. In this case, if the movement of the own movable body were restricted, control against the intention of the operator would be performed. However, when a process is performed for confirming the presence of an object based on the stable detection of the object to improve accuracy in detecting objects around the own movable body, a process for confirming the absence of an object is not immediately performed.

According to the above configuration, in a case where an obstacle is present in the moving direction of the own movable body, and a state where the obstacle is stably detected by a plurality of detection sections arranged in the direction perpendicular to the moving direction of the own movable body changes to a state where any of the detection sections does not detect the obstacle, it can be assumed that the obstacle has crossed over the moving direction (e.g. anterior or posterior direction of the vehicle) of the own movable body. Therefore, according to the above configuration, it can be appropriately determined that the obstacle has crossed.

What is claimed is:

1. An object detection apparatus which is installed in a movable body and detects an object present around the movable body, the apparatus comprising:
    a first detection section, using a processor, transmitting search waves in a moving direction of the movable body, and receives reflected waves of the search waves as detection information of the object, to detect the object;
    a second detection section, using a processor, transmitting search waves in the moving direction of the movable body from a position different from that of the first detection section, and receives reflected waves of the search waves as detection information of the object, to detect the object;
    an obstacle determination section, using a processor, determining that an obstacle is blocking a path of the movable body in the moving direction, based on a detection result of the object of the first detection section and a detection result of the object of the second detection section; and
    a path blocking determination section, using a processor, determining that the obstacle is not entirely blocking the path of the movable body when, in a state where the obstacle determination section determines that the obstacle is present, both the first and second detection sections detect the object for a predetermined time period and thereafter one of the first and second detection sections do not detect the object.

2. The object detection apparatus according to claim 1, wherein
    the path blocking determination section determines that the obstacle is not entirely blocking the path of the movable body in a state where the movable body is stopped.

3. The object detection apparatus according to claim 1, wherein
    the path blocking determination section determines that the obstacle is not entirely blocking the path of the movable body in a state where a distance between the movable body and the object is within a predetermined short distance range.

4. The object detection apparatus according to claim 1, further comprising:
    an absence determination section, using a processor, determining that the obstacle is absent when, in a state where the obstacle determination section determines that the obstacle is present, both the first and second detection sections do not detect the object for a predetermined time period after an absence determination time period has passed, wherein
    the path blocking determination section determines that the obstacle is not entirely blocking the path of the movable body before the absence determination time period passes, if one of the first and second detection sections does not detect the object.

5. The object detection apparatus according to claim 1, wherein the apparatus is applied to a system including a restriction section which restricts movement of the movable body when the obstacle is present in the moving direction of the movable body, and the apparatus further comprising:
an instruction section, using a processor, instructing the restriction section to release the restriction when the path blocking determination section determines that the obstacle is not entirely blocking the path of the movable body.

6. A computer-implemented method, performed by one or more processors, for detecting an object present around a movable body comprising:
transmitting search waves in a moving direction of the movable body from a first position, and receiving reflected waves of the search waves as detection information of the object, to detect the object and generate a first detection result;
transmitting search waves in the moving direction of the movable body from a second position that is different from the first position, and receiving reflected waves of the search waves as detection information of the object, to detect the object and generate a second detection result;
determining that an obstacle is blocking a path of the movable body, based on the first and second detection results; and
determining that the obstacle is not entirely blocking the path of the movable body when, in a state where it is determined that the obstacle is present, one of the first and second detection results does not indicate detection of the object after both the first and second detection results initially indicated detection of the object for a predetermined time period.

7. The method of claim 6, further comprising:
determining that the obstacle is not entirely blocking the path of the movable body in a state where the movable body is stopped.

8. The method of claim 6, further comprising:
determining that the obstacle is not entirely blocking the path of the movable body in a state where a distance between the movable body and the object is within a predetermined short distance range.

9. The method of claim 6, further comprising:
determining that the obstacle is absent when, in a state where it is determined that the obstacle is present, both the first and second detection results do not indicate detection of the object for a predetermined time period after an absence determination time period has passed; and
determining that the obstacle is not entirely blocking the path of the movable body before the absence determination time period passes, when one of the first and second detection results do not indicate detection of the object.

10. A system for detecting an object present around a movable body comprising:
a central processor;
a computer-readable storage medium; and
a set of computer-executable instructions stored on the computer-readable storage medium that cause the central processor to:
transmit search waves in a moving direction of the movable body from a first position, and receiving reflected waves of the search waves as detection information of the object, to detect the object and generate a first detection result;
transmit search waves in the moving direction of the movable body from a second position that is different from the first position, and to receive reflected waves of the search waves as detection information of the object, to detect the object and generate a second detection result;
determine that an obstacle is blocking a path of the movable body, based on the first and second detection results of the object; and
determining that the obstacle is not entirely blocking the path of the movable body when, in a state where it is determined that the obstacle is present, one of the first and second detection results does not indicate detection of the object after both the first and second detection results initially indicated detection of the object for a predetermined time period.

11. The system of claim 10, wherein the set of computer-executable instructions stored on the computer-readable storage medium further cause the central processor to:
determine that the obstacle is not entirely blocking the path of the movable body in a state where the movable body is stopped.

12. The system of claim 10, wherein the set of computer-executable instructions stored on the computer-readable storage medium further cause the central processor to:
determine that the obstacle is not entirely blocking the path of the movable body in a state where a distance between the movable body and the object is within a predetermined short distance range.

13. The system of claim 10, wherein the set of computer-executable instructions stored on the computer-readable storage medium further cause the central processor to:
determine that the obstacle is absent when, in a state where it is determined that the obstacle is present, both the first and second detection results do not indicate detection of the object for a predetermined time period after an absence determination time period has passed; and
determine that the obstacle is not entirely blocking the path of the movable body before the absence determination time period passes, when one of the first and second detection results do not indicate detection of the object.

14. The system of claim 10, wherein,
the system is applied to a movable body control system that includes a vehicle travel restrictor that restricts travel of the movable body by applying a restriction when the obstacle is present in the moving direction of the movable body, and
the set of computer-executable instructions stored on the computer-readable storage medium further causing the central processor to:
instruct the vehicle travel restrictor to release the restriction when determining that the obstacle is not entirely blocking the path of the movable body.

* * * * *